(12) United States Patent
    Regev (10) Patent No.: US 11,173,936 B1
(45) Date of Patent: Nov. 16, 2021

(54) COLLAPSIBLE FRAME FOR A CART

(71) Applicant: Yuval Regev, Nes-Ziona (IL)

(72) Inventor: Yuval Regev, Nes-Ziona (IL)

( * ) Notice: Subject to any disclaimer, the term of this patent is extended or adjusted under 35 U.S.C. 154(b) by 0 days.

(21) Appl. No.: 17/315,407

(22) Filed: May 10, 2021

(30) Foreign Application Priority Data

May 12, 2020 (IL) .......................................... 274605

(51) Int. Cl.
    B62B 3/02 (2006.01)

(52) U.S. Cl.
    CPC ............ B62B 3/02 (2013.01); *B62B 2301/04* (2013.01)

(58) Field of Classification Search
    CPC ...................................................... B62B 3/02
    See application file for complete search history.

(56) References Cited

U.S. PATENT DOCUMENTS

| 1,771,836 | A | * | 7/1930 | Beckham | ................. | B62B 3/02 |
| | | | | | | 280/640 |
| 4,989,749 | A | * | 2/1991 | Choi | ..................... | B62B 3/02 |
| | | | | | | 220/9.4 |
| 5,016,893 | A | | 5/1991 | Hart, Jr. | | |
| 5,123,665 | A | | 6/1992 | Levy | | |
| 8,428,206 | B2 | | 4/2013 | Li | | |
| 8,882,135 | B1 | * | 11/2014 | Chen | ..................... | B62B 3/02 |
| | | | | | | 280/651 |
| 9,145,154 | B1 | * | 9/2015 | Horowitz | ................. | B62B 7/008 |
| 9,409,665 | B1 | * | 8/2016 | Gregory | .............. | B65B 67/1205 |
| 9,428,206 | B1 | | 8/2016 | Morton | | |
| 9,738,298 | B1 | * | 8/2017 | Yang | ..................... | B62B 5/0003 |
| 10,370,018 | B1 | * | 8/2019 | Maher | .................... | B62B 13/18 |
| 10,633,010 | B1 | | 4/2020 | Zhang | | |
| 10,953,903 | B1 | * | 3/2021 | Park | ....................... | B62B 3/007 |
| 2011/0204598 | A1 | | 8/2011 | Stevenson | | |
| 2018/0327011 | A1 | * | 11/2018 | Horowitz | ................ | B62B 5/065 |
| 2020/0283046 | A1 | * | 9/2020 | Wu | ......................... | B62B 3/007 |
| 2020/0345565 | A1 | * | 11/2020 | Pierce | ................ | A61G 3/0808 |
| 2021/0039696 | A1 | * | 2/2021 | Tong | ........................ | B62B 3/02 |
| 2021/0107548 | A1 | * | 4/2021 | Wang | ..................... | B62B 3/025 |

(Continued)

FOREIGN PATENT DOCUMENTS

| CN | 206968709 | 2/2018 |
| DE | 202013103561 | 10/2013 |
| DE | 202014100645 | 5/2014 |

(Continued)

OTHER PUBLICATIONS

Office Action and Search Report dated Nov. 16, 2020 From the Israel Patent Office Re. Application No. 274605. (8 Pages).

(Continued)

*Primary Examiner* — Bryan A Evans (57) ABSTRACT

A collapsible cart frame includes four vertical bars defining four corners of the cart frame, four scissor linkages extending between different pairs of the vertical bars to define four sides of the cart frame and four wheels mounted at the bottom ends of the vertical bars. The scissor linkages are configured to expand and collapse independently from one another. Each of the lower scissor ends are attached to a pair of vertical bars at a fixed height and each of the upper scissor ends are slidably attached to the pair vertical bars. Height defining elements selectively define heights of at least one of the upper scissor ends of each of the scissor linkages.

20 Claims, 6 Drawing Sheets

(56) References Cited

U.S. PATENT DOCUMENTS

2021/0114643 A1* 4/2021 Sun .................. B62B 5/067
2021/0206413 A1* 7/2021 Candelario ............ B62B 5/06

FOREIGN PATENT DOCUMENTS

EP          1700769       9/2006
KR          10-2000998    7/2019

OTHER PUBLICATIONS

International Search Report and the Written Opinion dated Jul. 19, 2021 From the International Searching Authority Re. Application No. PCT/IL2021/050529. (10 Pages).

* cited by examiner

COLLAPSIBLE FRAME FOR A CART

RELATED APPLICATION

This application claims the benefit of priority of Israel Patent Application No. 274605 filed on May 12, 2020, the contents of which are incorporated by reference as if fully set forth herein in their entirety.

FIELD AND BACKGROUND OF THE INVENTION

The present invention, in some embodiments thereof, relates to a collapsible cart frame and, more particularly, but not exclusively, to a versatile cart frame configured for carrying and transporting household items including for example groceries and tools.

Collapsible shopping carts including two or four wheels for mobility are known. One common design is a two wheeled shopping basket that can be folded in a flat configuration. Other collapsible frames are known for holding a laundry basket or a litter basket. Wide spread use of collapsible frames is presently limited due to limitation in one or more of volume capacity of the frame in an expanded state, compactness in a collapsed state, ease in which the frame can be expanded and collapsed, a load that the frame can bear, and versatility of the frame for use in different tasks.

SUMMARY OF THE INVENTION

According to an aspect of some embodiments of the present invention there is provided a cart frame that is versatile, strong and easy to manipulate. In some example embodiments, the frame may assume different geometries while maintaining a constant height. Furthermore, the frame is collapsible in two dimensions and therefore is compact when collapsed. According to some example embodiments, the cart frame is relatively light weight while being configured to bear relatively heavy loads. The cart frame may be used to carry and transport household items and may also be used for example by technicians, electricians, plumbers, gardeners and building contractors to carry tools and materials.

According to an aspect of some example embodiments, there is provided a collapsible cart frame comprising: four vertical bars defining four corners of the cart frame, wherein each of the vertical bars include a bottom end and a top end; four scissor linkages, each extending between a different pair of the vertical bars to define four sides of the cart frame, wherein each of the four scissor linkages extends along one side of the cart frame; and four wheels, each mounted at the bottom end of one of the vertical bars, wherein each of the scissor linkages is configured selectively expanded and collapsed independently from the other scissor linkages.

Optionally, the cart frame is configured to be locked into different shapes and sizes based on independently controlling expansion of each of the scissor linkages.

Optionally, each of the scissor linkages are attached to pair of the vertical bars at four ends, wherein the four ends include two lower scissor ends and two upper scissor ends and wherein the lower scissor ends are attached to the pair of vertical bars at a fixed height and the upper scissor ends are slidably attached to the pair vertical bars.

Optionally, at least one of the two lower scissor ends is attached to at least one vertical bar with a ring that is rotatable about the vertical bar.

Optionally, the collapsible cart frame further includes a lock configured to lock the at least one of the two lower scissor ends to a desired angle with respect to the other of the two lower scissor ends.

Optionally, each of the two upper scissor ends is fixedly attached to an annular element through which one of the vertical bars from the pair is received and wherein the annular element is configured to slide along a height of that vertical bar.

Optionally, each of the two upper scissor ends is fixedly attached to annular cuffs fitted around the vertical bars and lockable at a selected height along the vertical direction.

Optionally, each of the vertical bars is attached to two scissor linkages and wherein an upper scissor end of one of the two scissor linkages slides along a first portion of the vertical bar and an upper scissor end of the other of the two scissor linkages slides along a second portion of the vertical pole, wherein the first portion and the second portion do not overlap.

Optionally, one of the two scissor linkages has a maximum length longer than a maximum length of the other of the two scissor linkages.

Optionally, one of the two scissor linkages includes a single X linkage and another of the two scissor linkages includes a double X linkage.

Optionally, at least one of the vertical bars includes a stopper and wherein the stopper is configured to limit expansion of one of the scissor linkages attached to the at least one of the vertical bars and wherein the stopper is configured to be selectively adjusted and locked to a desired height over a defined range of heights.

Optionally, at least one of the vertical bars includes an elongated slot and wherein the stopper is configured to slide along the slot when pressed and lock to a desired height when released.

Optionally, each of the vertical bars is attached to two scissor linkages with annular cuffs and wherein a first annular cuff is configured to limit expansion of one of the scissor linkages and a second annular cuff is configured to limit expansion another one of the scissor linkages based on locking the annular cuffs at defined heights along the vertical bars.

Optionally, the first annular cuff is configured to be selectively adjusted independently from selective adjustment of the second annular cuff.

Optionally, the collapsible cart frame further includes at least two horizontal bars, wherein each of the two horizontal bars is mounted at each end to one of the vertical bars and extends along one side of the cart frame.

Optionally, each of the at least two horizontal bars are telescopic bars.

Optionally, each of the at least two horizontal bars are configured to be removably connected to one of the vertical bars and fixedly connected to another one of the vertical bars.

Optionally, each of the at least two horizontal bars is configured to fold to a vertical orientation when disengaged from one of the vertical bars.

Optionally, each of the at least two horizontal bars includes a hinged connection and wherein the horizontal bars is configured to fold about the hinged connection.

Optionally, the at least two horizontal bars is mounted over the upper end of the vertical bars.

Optionally, each of the at least two horizontal bars includes a pin removably fitted into at least one of a bore within one of the vertical bars and a cup fixedly attached to one of the vertical bars.

Optionally, the pin includes a magnet at its tip.

Optionally, the collapsible cart frame further includes at least one hook slidably attached to one of the at least two horizontal bars.

Optionally, the collapsible cart frame further includes four horizontal bars, wherein each of the four horizontal bars extends along one side of the cart frame.

Optionally, at least two of the wheels are swivel wheels.

Optionally, a height of the four vertical bars is fixed.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to a collapsible cart frame and, more particularly, but not exclusively, to versatile cart frame configured for carrying and transporting household items including for example groceries tools and equipment.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

According to an aspect of some example embodiments, the cart frame includes four vertical bars held together with four scissor linkages, together defining four sides of the cart frame. Each vertical bar includes a wheel at a lower end based on which the cart may be rolled. Optionally, at least two of the wheels are swivel wheels. Preferably, all four wheels are swivel wheels. According to some embodiments, each side of the cart frame includes one of the scissor linkages extending between a pair of the vertical bars. The scissor linkages are operative in lazy tong fashion. According to some example embodiments, each of the four scissor linkages is configured to expand and collapse independently from one another. Optionally, some or all of the vertical bars includes locks and/or stoppers that lock the cart frame to a desired configuration.

According to some example embodiments, the cart frame additionally includes four horizontal bars, each of which extends between a pair of the vertical bars and parallel to scissor linkage also extended between the pair of vertical bars. According to some example embodiments, each of the horizontal bars are telescopically extending and extend and retract together along with expansion and collapsing of the scissor linkage extending between the same pair of vertical bars. Optionally, the horizontal telescopically extending bars are mounted on top ends of the four vertical bars with a pin and/or hinge connection. Optionally, one or more of the horizontal bars is housed in a vertical bar and may be extended out of the vertical bar and bent or pivoted to a horizontal orientation.

According to some example embodiments, the four horizontal telescopically extending bars form an upper frame that is weight bearing. The upper frame may form a square, rectangular or trapezoid perimeter based on selectively extending or retracting the horizontal bars together with the scissor linkages. In some example embodiments, a basket may be fitted, hung or mounted on the upper frame. Alternatively and additionally, the cart frame may be used without a basket. For example an object may be positioned directly on the upper frame. In some example embodiments, the scissor linkages are also configured to be weight bearing and a load may also be positioned directly on the scissor linkages. Optionally, one or more of the horizontal bars may be disengaged during use of the cart frame e.g., when carrying bulky items directly on the scissor linkage. Optionally, the vertical bars and scissor linkages support the geometry of the cart frame and cart frame is stable even without the horizontal bars. Optionally, a handle is mounted on a pair of vertical bars or directly on one or more of the horizontal bars. Optionally, the handle is also telescopic.

According to some example embodiments, the cart frame is configured to collapse for easy and compact storage based on disengaging one end of each horizontal bar from a vertical bar and collapsing each of the scissor linkages. According to some example embodiments, each horizontal bar includes a first end that is configured to disengage from the vertical bar on which it is mounted and an opposite end configured to fold to a vertical orientation, e.g. pivot downwards. Folding may be based on a hinged connection along the horizontal bar, e.g. substantially near one end of the horizontal bar or based on a hinged connection between the horizontal bar and the vertical bar. The horizontal bars may be telescopically retracted while storing the cart in its collapsed configuration and telescopically extended when assembled. Collapsing of the cart frame occurs in two dimensions and provides a compact configuration of the cart frame for storage while not in use.

In some example embodiments, the cart frame is 80 cm-1.2 m height, e.g. 88 cm. Optionally a length and width of the cart frame in its full extended disposition may be 80 cm×40 cm to 150 cm×70 cm, e.g. 110 cm×56 cm. Optionally, in a full collapsed state, a frame cart may reach a length and width of 15 cm×12 cm to 10 cm×8 cm, e.g. 12 cm×10 cm. Optionally, volume of the cart frame may be 10 liters in a collapsed stated as compared to 70 liters-80 liters in a fully expanded state. Other sizes are contemplated within the scope of the present invention. In some example embodiments, the cart frame is made with aluminum profiles. Optionally, a diameter of the vertical bars and the scissor linkages are between 15-35 mm for an aluminum cart frame configured for household use. Optionally, larger diameters, e.g. up to 50 mm may be used for a cart frame configured for carrying heavy duty items.

Figure 1:
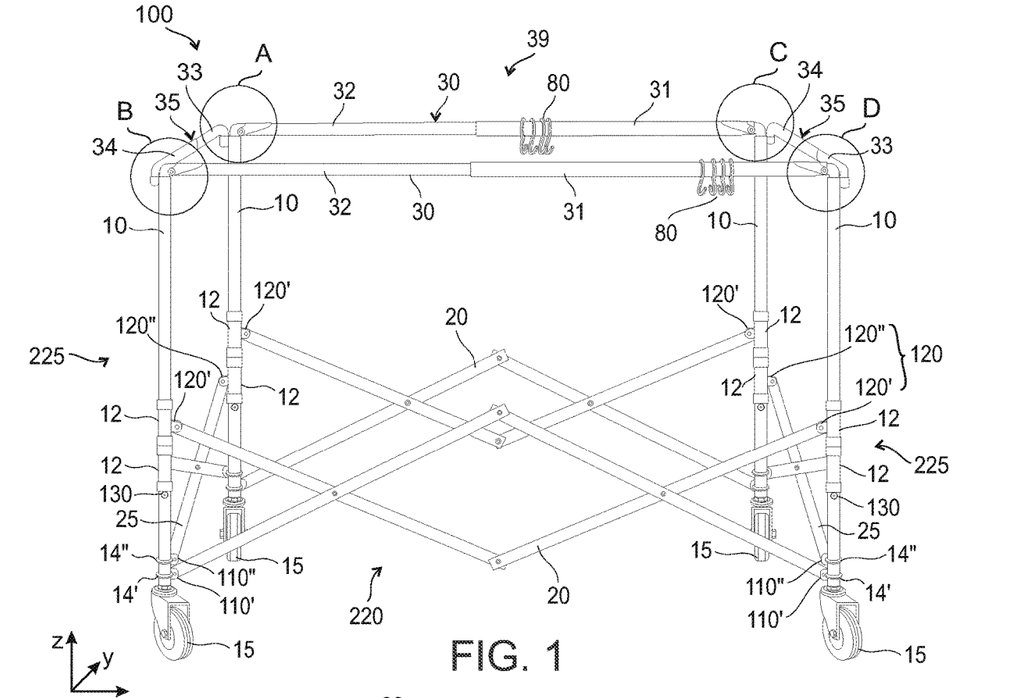
FIG. 1 is an example cart frame in a fully expanded state in accordance with some example embodiments.

Referring now to the drawings, FIG. 1 shows an example cart frame in a fully expanded state in accordance with some example embodiments. According to some example embodiments, a cart frame 100 includes four vertical bars 10, each including a wheel 15 on which cart frame 100 is configured to stand. Optionally and preferably, vertical bars 10 have a fixed height. In some examples, the height of vertical bars 10 is 80 cm-1.2 cm, e.g. 88 cm. The present inventor has found that a height of 88 cm is a comfortable ergonomic height. Optionally, one or more of vertical bars 10 may be telescopic.

In some example embodiments, cart 100 in its fully expanded state forms a rectangular cuboid including two longer sides 220 extending along an X direction, each formed with a pair of vertical bars 10 connected with a scissor linkage 20 (a longer scissor linkage) and two shorter sides 225 extending along a Y direction, each formed with a pair of vertical bars 10 that are connected with a scissor linkage 25 (a shorter scissor linkage). Optionally and preferably, scissor linkage 25 includes a single X linkage, e.g. two cross bars forming an X shape with a central hinge. Optionally and preferably, scissor linkage 20 includes a double X linkage, e.g. two single X linkages connected at two ends with a hinge connection. Each of the scissor linkages 20 and 25 may be connected to a pair of vertical bars 10 at four scissor ends. The four scissor ends include two lower scissor ends 110 and two upper scissor ends 120 (upper scissor ends 120' for scissor linkage 20 and upper scissor ends 120" for scissor linkage 25). According to some example embodiments, bottom scissor ends 110 of at least one scissor linkage and preferably all scissor linkages are fixedly attached to vertical bars 10. Optionally, bottom scissor ends 110 are fixed at a lower end of vertical bar 10 substantially near wheel 15. In some example embodiments, bottom scissor ends 110 are fixed to vertical bars 10 with pairs of rings 14 (rings 14' and 14"). In some example embodiments, at least one of rings 14 is free to rotate about its vertical bar 10 at its fixed height so that an angle between sides 220 and 225 of cart frame 100 may be adjusted to obtain a desired shape of chart frame 100. Optionally, upper scissor ends 120 of at least one scissor linkage and preferably all scissor linkages are slidable along vertical bars 10. In some example embodiments, an upper scissor end of a scissor linkage and vertical bar 10 is connected with a slidable connection, e.g. annular element 12 or ring that slides along vertical bar 10. Optionally, annular element 12 is welded or otherwise fixedly attached to an upper end 120. Alternatively or additionally, the slidable connection between at least one upper end and vertical bar 10 is a pin fixedly attached to an upper end 120 of a scissor linkage that is slidably fitted in a slot along vertical bar 10. Upper ends 120 of a scissor linkage may slide upwards while being collapsed and slide downwards while being expanded. According to some example embodiments, upper ends 120' and upper ends 120" slide along different heights of vertical bar 10 that do not overlap, e.g. upper ends 120' have a full range of motion above upper ends 120" and upper ends 120" have a full range of motion below upper ends 120'. Optionally, vertical bar 10 is a double profile bar, e.g. a pair of bars, and each slidable connection slides along a dedicated profile of the double profile. In some example embodiments, a stopper 130 may be mounted on vertical bars 10 to block one or more of upper ends 120 from sliding below a selected height. Optionally, stoppers 130 include first stopper(s) 130' for upper ends 120' and second stopper(s) 130" for upper ends 120". According to some example embodiments, stoppers 130 lock cart frame 100 to a desired size and shape. Stoppers 130 may maintain their position while cart frame 100 is being collapsed so that cart frame 100 may be subsequently expanded to same selected size and shape after being collapsed, e.g. stoppers 130 may remember a previously selected configuration of cart frame 100. Optionally, stoppers 130 are spring activated and may slide along vertical bars 10 when pressed and lock when released. Operation of example stoppers 130 is described in more detail in reference to FIG. 5A. In some alternate embodiments, stoppers 130 are not adjustable but rather fixed at a position that defines a shape of cart frame 100 in an expanded state and cart frame 100 has one defined size and shape in its expanded form.

According to some example embodiments, cart frame 100 includes horizontal bars 30 and 35 extending between pairs of vertical bars 10. Horizontal bars 30 and 35 together define an upper frame 39 of cart frame 100. In some example embodiments, horizontal bars 30 and 35 are mounted over vertical bars 10 and/or substantially at an upper end of vertical bars 10. Optionally and preferably, horizontals bars 30 extend along the longer sides of cart frame 100 and horizontal bars 35 extend along the shorter sides of cart frame 100. According to some example embodiments, horizontal bars 30 are telescopic and include first telescopic section 32 configured to receive a second telescopic section 31. Likewise, horizontal bars 35 may also be telescopic and include first telescopic section 34 configured to receive a second telescopic section 33. Optionally, horizontal bars 30 and/or horizontal bars 35 may include more than two telescopic sections, e.g. three telescopic sections. Optionally, horizontal bars 30 and/or horizontal bars 35 may be stored within vertical bars 10 and pulled out of vertical bars 10 for use. In some example embodiments, one or more hooks 80, clasps, or other accessories may be positioned on horizontal bars 30 and/or horizontal bars 35. Hooks may be used to hang shopping bags or other loads. Optionally hooks 80 are free to slide along the horizontal bars so that a user can arrange as desired.

In some example embodiments, cart frame 100 does not include horizontal bars 30 and/or 35. Alternately, one or more of horizontal bars 30 and/or 35 may be removed and added as an accessory. Optionally, pins with a flat head may be alternatively mounted on verticals bars 10 to support a flat surface, e.g. a table top.

In some example embodiments, wheels 15 may be removable, e.g. may be pulled off of vertical bars 10 and replaced. Optionally, wheels 15 are selected based on the terrain over which cart frame is configured to move. For example, larger wheels that are inflated may be used for pushing cart frame 100 over sandy surface and smaller wheels may be used to push cart frame 100 over smooth hard surfaces. Optionally, the wheels 15 may be replaced with ends for legs of a table.

Figure 2:
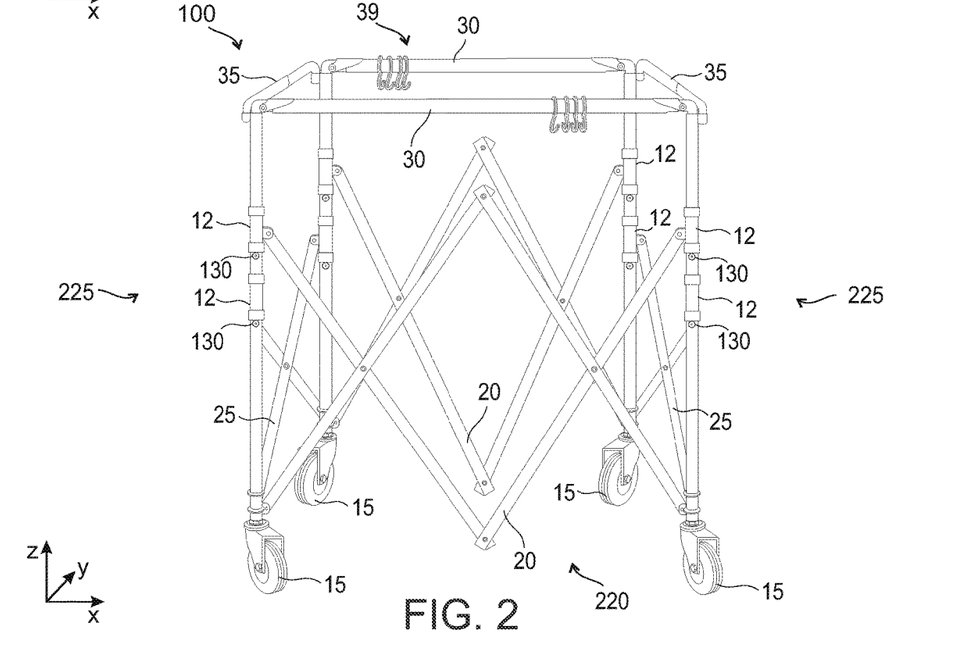
FIG. 2 is an example cart frame in a partially expanded state in accordance with some example embodiments.
Figure 3:
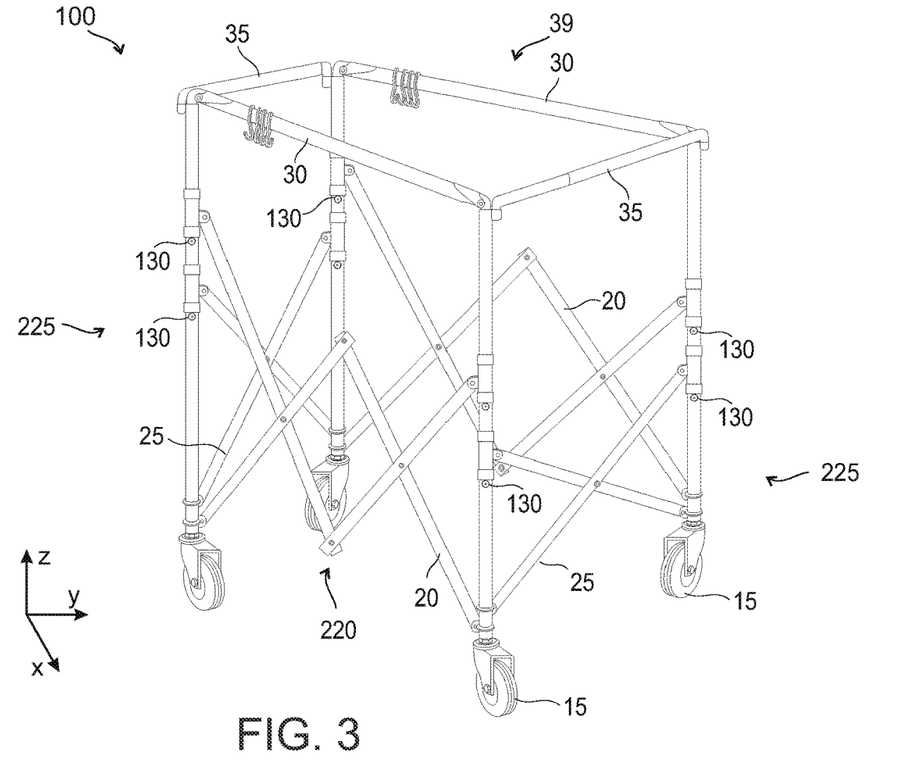
FIG. 3 is an example cart frame in an asymmetrically expanded state in accordance with some example embodiments.
Figures 4A, 4B:
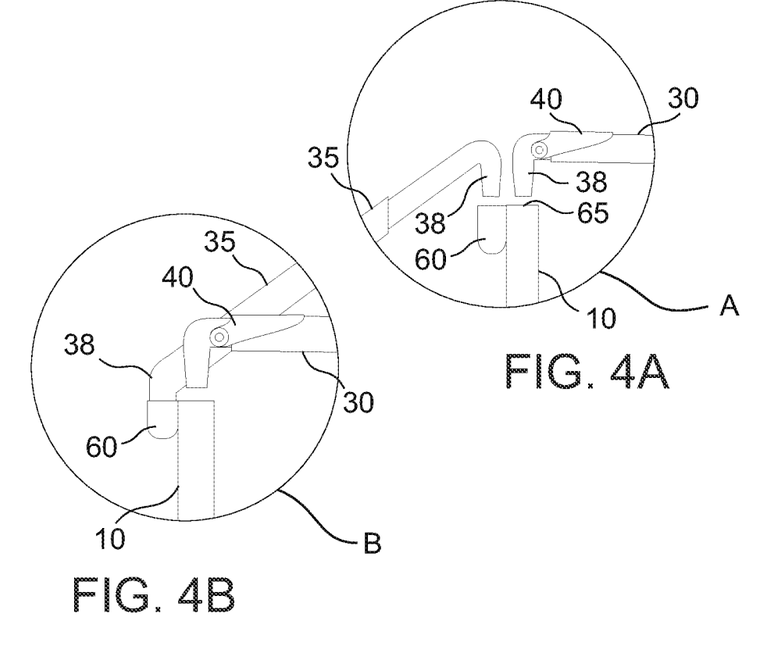
FIGS. 4A, 4B, 4C and 4D are detail views of each upper corner of the cart frame in an open configuration, all in accordance with some example embodiments.
Figures 4C, 4D:
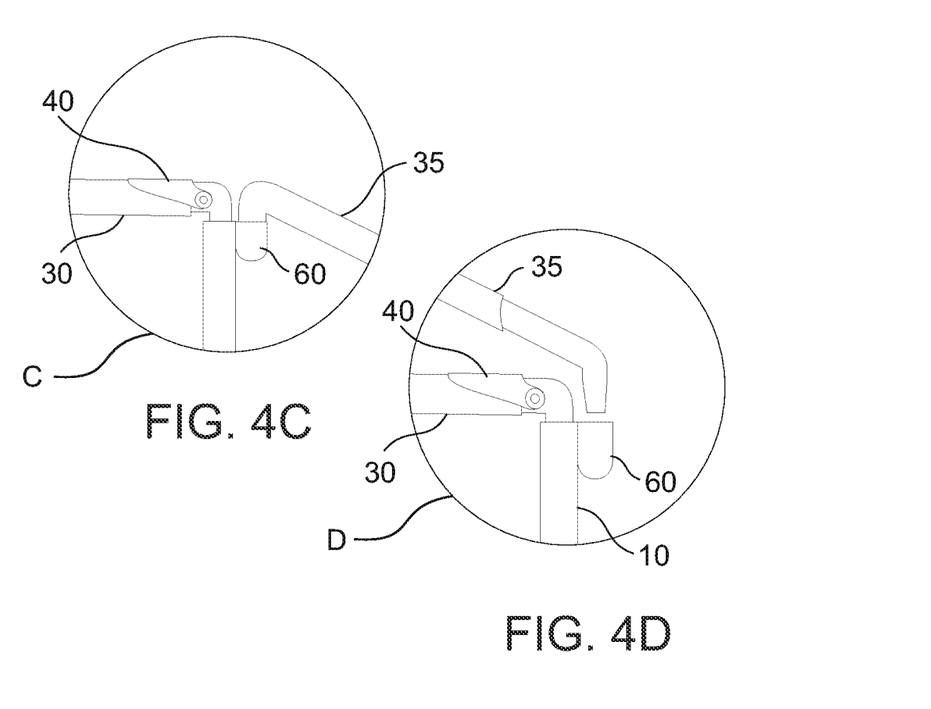

Reference is now made to FIG. 2 showing an example cart frame in a partially expanded state and to FIG. 3 showing the example cart frame in an asymmetrically expanded state, both in accordance with some example embodiments. According to some example embodiments, some or all of the four scissor linkages (two scissor linkages 20 and two scissor linkages 25) may be expanded and collapsed independently for each other. Horizontal bars 30 and 35 may extend and retract based movement of the scissor linkage associated with it. According to some example embodiments, one or more stoppers 130 lock cart frame 100 to a desired size and shape. In the examples shown in FIGS. 2 and 3 all four scissor linkages are locked in a partially expanded configuration. Vertical bars 10 may maintain a same height for all configurations of cart frame 100.

In some example embodiments, a range of lengths for each of scissor linkages 20 and horizontal bars 30 may be for example 50 cm-110 cm and a range of lengths for each of scissor linkages 25 and horizontal bars 35 may be for example 25 cm-56 cm. Other ranges may be contemplated and are within the scope of the present invention.

In the example shown in FIG. 2, cart frame 100 is in a square shaped configuration based on expanding sides 220 and sides 225 to have common lengths. In FIG. 3 sides 220 are expanded to a common length and each of sides 225 are expanded to different lengths. This asymmetric expansion provides a trapezoidal configuration of upper frame 39, e.g. similar to a classic shopping cart in a supermarket. One or more of stoppers 130 may be moved to alter a shape of cart frame 100. Optionally, stoppers 130 are spring activated and may slide along vertical bars 10 when pressed and lock when released.

FIGS. 4A, 4B, 4C and 4D are detail views of each upper corner of the cart frame in an open configuration, all in accordance with some example embodiments. Each of horizontal bars 30 and horizontal bars 35 are fixedly attached at one end to one vertical bar 10 and removably attached at an opposite end to another vertical bar 10. In some example embodiments, horizontal bars 30 and horizontal bars 35 include a pin 38 at one end that is fitted into a bore 65 in vertical bar 10 or a cup (or ring) 60 fixed to an upper end over vertical bar 10. Optionally, pin 38 is a magnetic element and/or includes a magnet at its tip that clicks into place, e.g. into bore 65 and/or cup 60 (that is metallic) due to magnetic force. Other connections are contemplated including a snap connection, clasp connection and other mechanical connections. Optionally, cup 60 is welded to vertical bar 10. Optionally, horizontal bars 30 that are longer and heavier are fitted into bore 65 of vertical bar 10 and horizontal bars 35 that are lighter and shorter are fitted into cup 60. Optionally, at a first corner (FIG. 4A) of cart frame 100 horizontal bar 30 are removably fitted into bore 65 and horizontal bar 35 are removably fitted into cup 60, at a second corner (FIG. 4B) horizontal bar 30 is removably fitted into bore 65 and horizontal bar 35 is fixedly fitted into cup 60, at a third corner (FIG. 4C) horizontal bar 30 is fixedly fitted into bore 65 and horizontal bar 35 is removably fitted into cup 60 and at a fourth corner (FIG. 4D) horizontal bar 30 is fixedly fitted into bore 65 and horizontal bar 35 fixedly fitted into cup 60. In some example embodiments, each of horizontal bars 30 and horizontal bars 35 fold downwards to a vertical positioning once released from vertical bars 10.

Figures 5A, 5B:
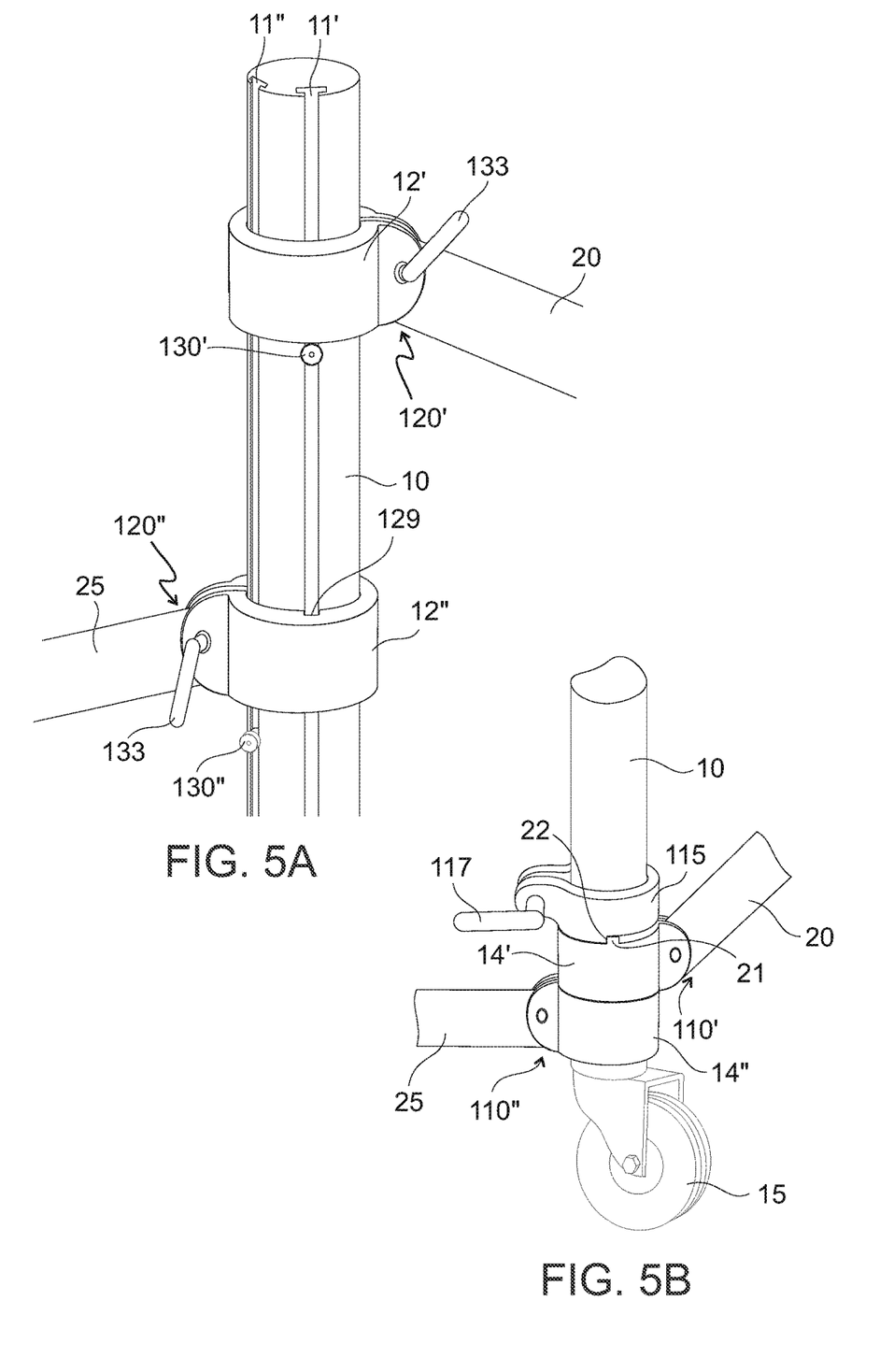
FIGS. 5A and 5B are details views with example features of the cart frame, all in accordance with some example embodiments.

Reference is now made to FIGS. 5A and 5B showing details views with example features of the cart frame, all in accordance with some example embodiments. FIG. 5A shows an example locking mechanism for defining a height for each of two upper scissor ends 120 (upper scissor ends 120' for scissor linkage 20 and upper scissor ends 120" for scissor linkage 25). Optionally, annular elements 12 (upper annular elements 12' and lower annular element 12") are annular cuffs, each of which may be fixed at a desired height with a handle 133 that is configured to press ends of the annular cuffs together when rotated and lock annular elements 12 in place. Optionally, annular cuffs with handles 133 are included on at least one and preferably all of vertical bars 10. Optionally, annular elements 12 on at least one of vertical bars 10 is a ring element without a locking feature and/or handle 133.

In some example embodiments, at least one and preferably at least two of vertical bars 10 include stoppers 130. A user may position each of stoppers 130 to a height that provides a desired size and shape for cart 100 so that cart frame 100 may be repeatedly expanded to same selected size and shape after being collapsed, e.g. stoppers 130 may remember a previously selected configuration of cart frame 100. Each of stoppers 130 (upper stopper 130' for annular element 12' and lower stopper 130" for annular element 12") slide along a dedicated rail and/or elongated slot 11 (rail 11' for stopper 130' and rail 11" for stopper 130"). Optionally, annular element 12" includes a notch 129 in which stopper 130' may be received when annular element 12" is raised to a height of stopper 130', e.g. in a collapsed stated of cart frame 100.

FIG. 5B shows an example locking mechanism based on which a user may define an angle between scissor linkages 20 and 25. In some example embodiments, ring element 14" is rotatable about vertical bar 10. A height of ring element 14" and optionally ring element 14' is fixed based ono annular cuff 115 being locked with handle 117 at a defined height along vertical bar 10. Handle 117 may be configured to press ends of the annular cuffs together when rotated and lock annular elements 115 in place. In some example embodiments, ring element 14" includes a tooth shaped protrusion that engages a side wall 22 on annular cuff 115. A desired angle may be fixed based on rotating annular cuff 115 and ring element 14' to a desired orientation with side wall 22 engaging tooth shaped protrusion 21 and locking annular cuff 115 with handle 117.

Figure 6:
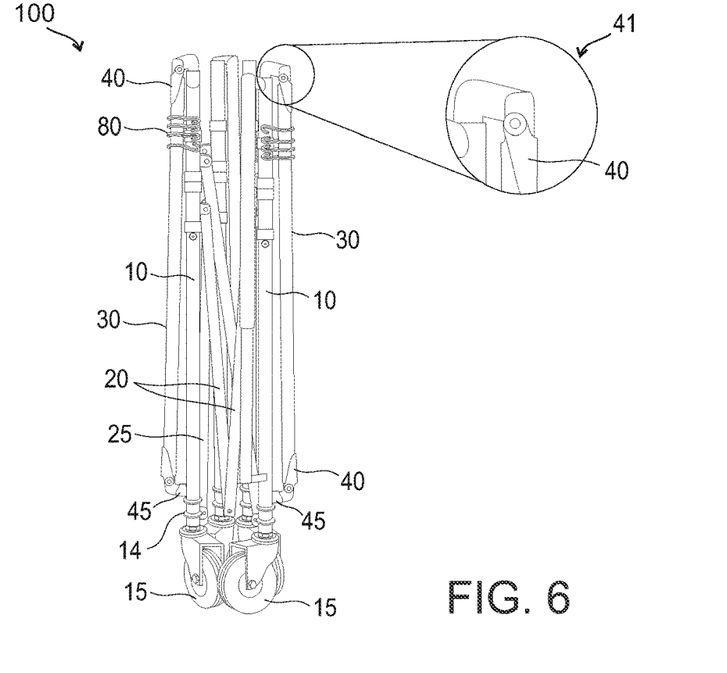
FIG. 6 is an example cart frame in a fully collapsed state in accordance with some example embodiments.

FIG. 6 is an example cart frame in a fully collapsed state in accordance with some example embodiments. According to some example embodiments, cart frame 100 may maintain a small footprint when in a fully collapsed state. Optionally, scissor linkages 20 and 25 are collapsed and all horizontal bars 30 and 35 are hanging in a vertical orientation. In some example embodiments, horizontal bars 30 and/or horizontal bars 35 fold to a vertical orientation with a hinge connection 41 proximal to a vertical bar 10. Optionally, a lever 40 that pivots about a hinge covers hinge connection 41, e.g. provides a smooth surface over hinge connection 41. In some example embodiments, one or more of horizontal bars 30 and/or 35 may instead be telescopically retracted into a vertical bar 10.

Optionally, wheels 15 may also be swiveled to form a rectangular footprint that is flush with the side of collapsed cart frame 100 and thereby further reduce the footprint of cart frame 100. In some example embodiments, cart frame 100 that expands to a maximum length (along X axis) of 110 cm and maximum width (along a Y axis) of 56 cm may be collapsed to a length of 12 cm and a width of 10 cm. A height of cart frame 100 may be maintained. Cart frame 100 may be expanded based on manually pulling vertical bars apart and collapsed by disengaging horizontal bars 30 and 35 at one end and then pushing vertical bars 10 toward each other. Optionally, one or more of vertical bars 10 may include a clasp 45 to hold horizontal bars 30 and 35 to vertical bar 10 at its free end, e.g. proximal to wheel 15. Alternatively and optionally, a pin 38 that includes a magnet (FIG. 4A) of horizontal bars 30 may click into a metal cup position on vertical bars 10.

Figure 7A:
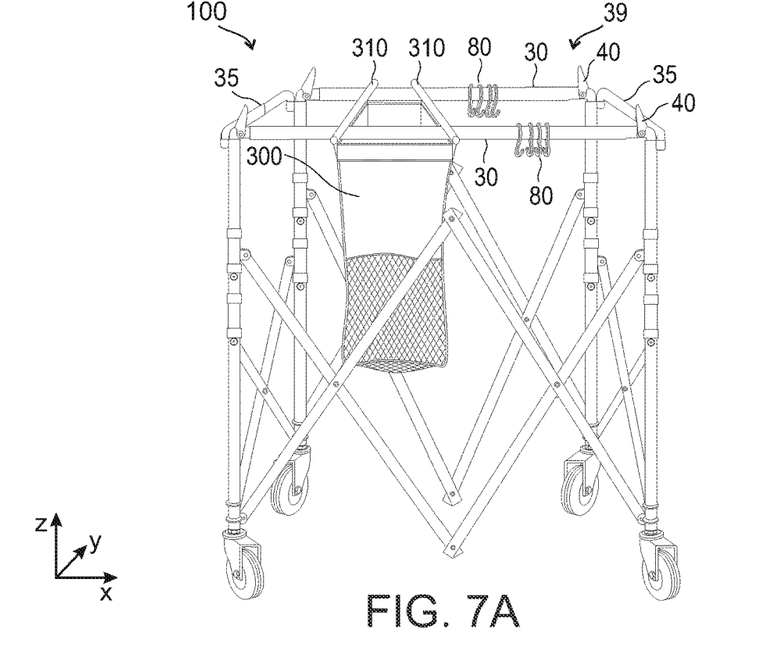
FIGS. 7A and 7B are example cart frames with a flexible bag and/or rigid container in accordance with some example embodiments.
Figure 7B:
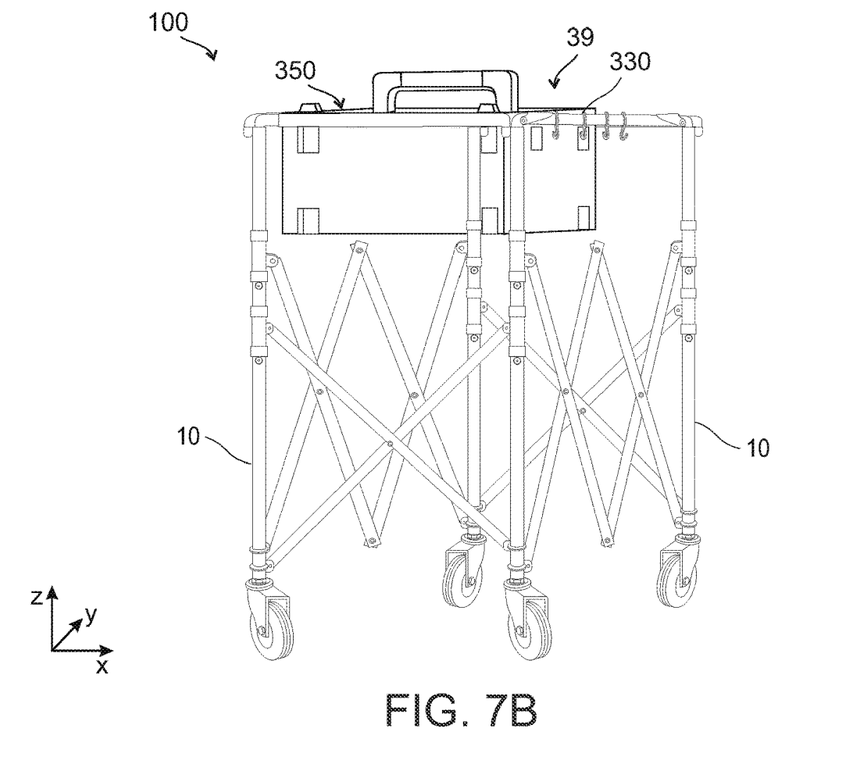

FIGS. 7A and 7B are example cart frames with a flexible bag and/or rigid container in accordance with some example embodiments. According to some example embodiments, one or more bags and/or baskets 300 may be mounted on upper frame 39, e.g. on horizontal bars 30 and/or 35. Basket 300 may be for example a reusable shopping bag that is fitted on upper frame 39 with a pair of poles 310. In some example embodiments, some or all of levers 40 may be lifted to provide barrier against possible slippage of poles 310 from horizontal bars 30. Handles of a shopping bag (reusable or disposable) may be hooked onto hooks 80. Cart frame 100 may be used to carry a plurality of different types of shopping bags and/or other objects concurrently. Optionally, shopping bag 300 may be sized to extend over substantially an entire length of horizontal bars 30 and 35. Optionally, a bag or box 350 may include clasps 330 that may clasp onto horizontal bars 30 and/or 35. A user may adjust size and shape of upper frame 39 so that the clasps may be fitted onto horizontal bars 30 and/or 35

Figure 8A:
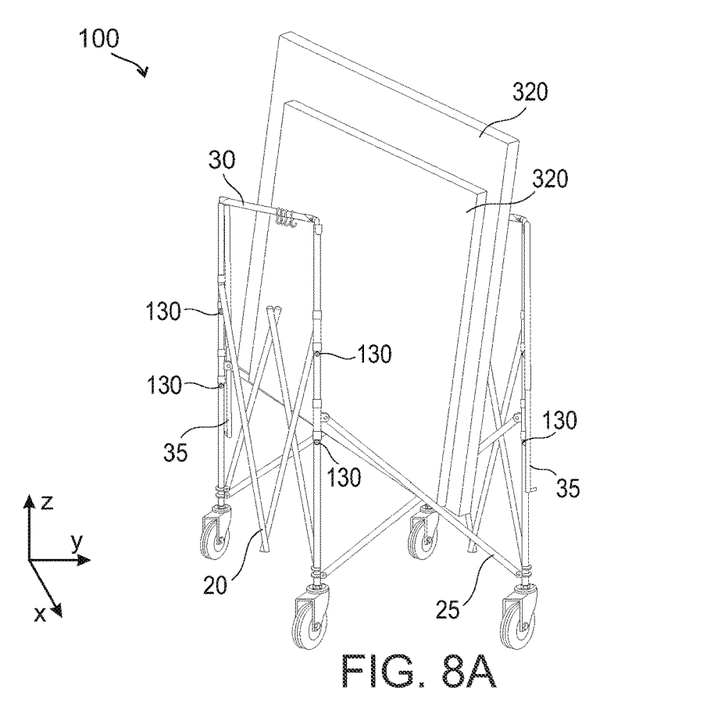
FIGS. 8A and 8B are example cart frames carrying loads without a basket, both in accordance with some example embodiments.
Figure 8B:
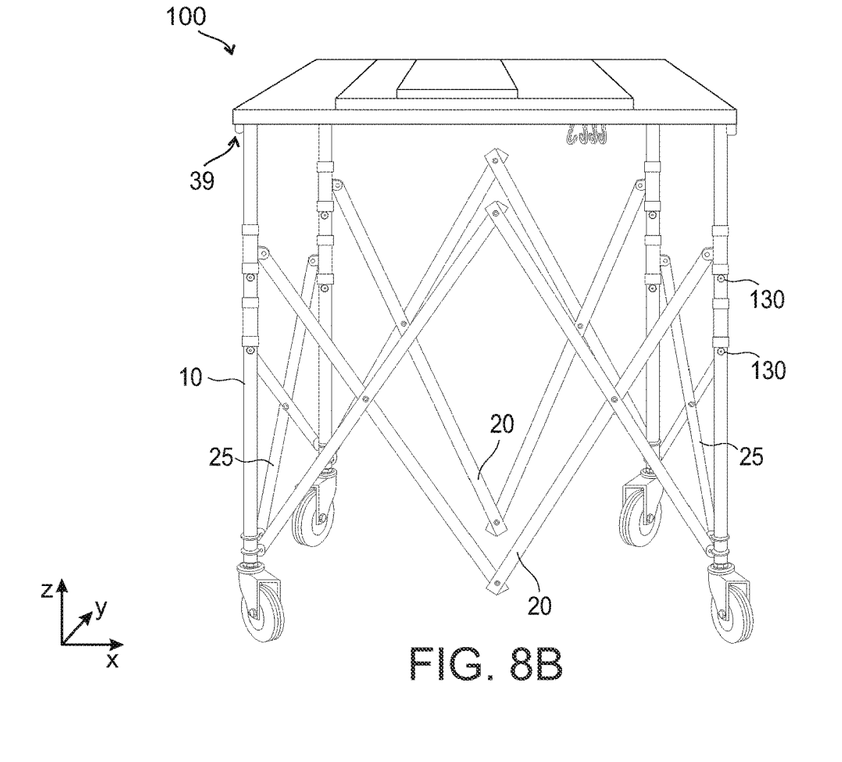

FIGS. 8A and 8B are example cart frames carrying loads without a basket, both in accordance with some example embodiments. According to some example embodiments, cart frame 100 is used to carry objects that are not necessarily contained within a bag or container that is mounted on cart frame 100. For example, cart frame 100 may be used to carry boards 320. Boards 320 may be mounted over upper frame 39 (FIG. 8B) or may be positioned directly on one of the scissor linkages 20 and/or 25. In some example embodiments, one or more horizontal bars 35 (or horizontal bars 30) may be disengaged while carrying an object. Optionally, by disengaging horizontal bars 35, board 320 that may be longer than a length of horizontal bar 30 may be fitted onto cart frame 100 (FIG. 8A). In some example embodiments, cart frame 100 may be used as a table based on mounting a board 320 over upper frame 39. Optionally, levers 40 (shown in FIG. 7A) may be lowered, e.g. flattened against horizontal bars 30 to provide a flat surface on which an object, e.g. board 320 may be positioned.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

What is claimed is:

1. A collapsible cart frame comprising:
   four vertical bars defining four corners of the cart frame, wherein each of the vertical bars include a bottom end and a top end;
   four scissor linkages, each extending between a different pair of the vertical bars to define four sides of the cart frame, wherein each of the four scissor linkages extends along one side of the cart frame;
   four wheels, each mounted at the bottom end of one of the vertical bars,
   wherein each of the scissor linkages is configured for selectively expanding and collapsing independently from the other scissor linkages,
   wherein each of the scissor linkages are attached to pair of the vertical bars at four ends,
   wherein the four ends include two lower scissor ends and two upper scissor ends, and
   wherein the lower scissor ends are attached to the pair of vertical bars at a fixed height and the upper scissor ends are slidably attached to the pair vertical bars; and
   height defining elements configured to selectively define heights of at least one of the upper scissor ends of each of the scissor linkages.

2. The collapsible cart frame of claim 1, wherein the cart frame is configured to be locked into different shapes and sizes based on independently controlling expansion of each of the scissor linkages.

3. The collapsible cart frame of claim 1, wherein at least one of the two lower scissor ends is attached to at least one vertical bar with a ring that is rotatable about the vertical bar and comprising a lock configured to lock the at least one of the two lower scissor ends to a desired angle with respect to the other of the two lower scissor ends.

4. The collapsible cart frame of claim 1, wherein each of the two upper scissor ends is fixedly attached to an annular element through which one of the vertical bars from the pair is received and wherein the annular element is configured to slide along a height of that vertical bar.

5. The collapsible cart frame of claim 1, wherein the height defining elements include annular cuffs fixedly attached to the at least one of the upper scissor ends, the annular cuffs fitted around the vertical bars and lockable at a selected height along the vertical direction.

6. The collapsible cart frame of claim 1, wherein each of the vertical bars is attached to two scissor linkages, wherein an upper scissor end of one of the two scissor linkages slides along a first portion of the vertical bar and an upper scissor end of the other of the two scissor linkages slides along a second portion of the vertical pole, wherein the first portion and the second portion do not overlap, and wherein one of the two scissor linkages has a maximum length longer than a maximum length of the other of the two scissor linkages.

7. The collapsible cart frame of claim 6, wherein one of the two scissor linkages includes a single X linkage and another of the two scissor linkages includes a double X linkage.

8. The collapsible cart frame of claim 1, wherein the height defining elements include a stopper on at least one of the vertical bars and wherein the stopper is configured to limit expansion of one of the scissor linkages attached to the at least one of the vertical bars and wherein the stopper is configured to be selectively adjusted and locked to a desired height over a defined range of heights.

9. The collapsible cart frame of claim 8, wherein at least one of the vertical bars includes an elongated slot and wherein the stopper is configured to slide along the slot when pressed and lock to a desired height when released.

10. The collapsible cart frame of claim 1, wherein each of the vertical bars is attached to two scissor linkages with annular cuffs and wherein a first annular cuff is configured to limit expansion of one of the scissor linkages and a second annular cuff is configured to limit expansion another one of the scissor linkages based on locking the annular cuffs at defined heights along the vertical bars and wherein the first annular cuff is configured to be selectively adjusted independently from selective adjustment of the second annular cuff.

11. The collapsible cart frame of claim 1, comprising at least two horizontal bars, wherein each of the two horizontal bars is mounted at each end to one of the vertical bars and extends along one side of the cart frame.

12. The collapsible cart frame of claim 11, wherein each of the at least two horizontal bars are telescopic bars.

13. The collapsible cart frame of claim 11, wherein each of the at least two horizontal bars are configured to be removably connected to one of the vertical bars and fixedly connected to another one of the vertical bars.

14. The collapsible cart frame of claim 13, wherein each of the at least two horizontal bars is configured to fold to a vertical orientation when disengaged from one of the vertical bars and wherein each of the at least two horizontal bars includes a hinged connection and wherein the horizontal bars is configured to fold about the hinged connection.

15. The collapsible cart frame of claim 11, wherein the at least two horizontal bars is mounted over the upper end of the vertical bars.

16. The collapsible cart frame of claim 15, wherein each of the at least two horizontal bars includes a pin removably fitted into at least one of a bore within one of the vertical bars and a cup fixedly attached to one of the vertical bars, wherein the pin includes a magnet at its tip.

17. The collapsible cart frame of claim 11, comprising at least one hook slidably attached to one of the at least two horizontal bars.

18. The collapsible cart frame of claim 11, comprising four horizontal bars, wherein each of the four horizontal bars extends along one side of the cart frame.

19. The collapsible cart frame of claim 11, wherein at least two of the wheels are swivel wheels.

20. The collapsible cart frame of claim 1, wherein a height of the four vertical bars is fixed.

* * * * *